(12) United States Patent
Denolf et al.

(10) Patent No.: US 11,954,359 B2
(45) Date of Patent: Apr. 9, 2024

(54) CIRCULAR BUFFER ARCHITECTURE USING LOCAL MEMORIES WITH LIMITED RESOURCES

(71) Applicant: Xilinx, Inc., San Jose, CA (US)

(72) Inventors: Kristof Denolf, Longmont, CO (US); Jack S. Lo, Santa Clara, CA (US); Louis Coulon, Miserey-Salines (FR); Kornelis A. Vissers, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 262 days.

(21) Appl. No.: 17/646,172

(22) Filed: Dec. 28, 2021

(65) Prior Publication Data

US 2023/0205452 A1 Jun. 29, 2023

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G06F 12/06
See application file for complete search history.

(56) References Cited

U.S. PATENT DOCUMENTS

| | | | |
|---|---|---|---|
| 7,359,276 B1 | 4/2008 | Turney et al. | |
| 2008/0209155 A1* | 8/2008 | Moreaux | G06F 12/0292 711/170 |
| 2010/0332755 A1* | 12/2010 | Bu | G06F 9/52 711/119 |
| 2018/0052659 A1* | 2/2018 | Thomas | G06F 13/404 |

OTHER PUBLICATIONS

M. Qasaimeh, J. Zambreno and P. H. Jones, "A Modified Sliding Window Architecture for Efficient BRAM Resource Utilization," 2017 IEEE International Parallel and Distributed Processing Symposium Workshops (IPDPSW), 2017, pp. 106-114, doi: 10.1109/IPDPSW.2017.61.

* cited by examiner

*Primary Examiner* — Michelle T Bechtold
(74) *Attorney, Agent, or Firm* — Kevin T. Cuenot

(57) ABSTRACT

A circular buffer architecture includes a memory coupled to a producer circuit and a consumer circuit. The memory is configured to store objects. The memory can include memory banks. The number of the memory banks is less than a number of the objects. The circular buffer can include hardware locks configured to reserve selected ones of the memory banks for use by the producer circuit or the consumer circuit. The circular buffer can include a buffer controller coupled to the memory and configured to track a plurality of positions. The positions can include a consumer bank position, a consumer object position, a producer bank position, and a producer object position. The buffer controller is configured to allocate selected ones of the objects from the memory banks to the producer circuit and to the consumer circuit according to the tracked positions and using the hardware locks.

20 Claims, 8 Drawing Sheets

CIRCULAR BUFFER ARCHITECTURE USING LOCAL MEMORIES WITH LIMITED RESOURCES

TECHNICAL FIELD

This disclosure relates to digital circuits and, more particularly, to circular buffer architectures for communication between producer and consumer data processing elements.

BACKGROUND

A wide variety of signal processing applications from machine learning to vision and/or image processing rely on data reuse to increase processing efficiency. Circular buffers are widely used as the means of providing data reuse within hardware implementations. As known, a circular buffer refers to a data structure that is realized in a physical memory device that appears to be organized in a circle with data wrapping around the circular buffer. An "N-element circular buffer" refers to a circular buffer that is capable of storing N different objects (e.g., data items), where N is an integer greater than 0.

In cases where the amount of memory resources available for a hardware implementation of an N-element circular buffer is plentiful, the N-element circular buffer may be implemented in a relatively straight forward manner. In cases where the amount of memory resources available for a hardware implementation of an N-element circular buffer is restricted or limited with respect to the requirements of the circular buffer, e.g., the number of elements to be stored, implementing an N-element circular buffer is a difficult and complex task requiring customized solutions to ensure efficient and deadlock free operation.

SUMMARY

In one or more examples, an electronic system includes a circular buffer. The circular buffer can include a memory coupled to a producer circuit and a consumer circuit. The memory is configured to store a plurality of objects. The memory can include a plurality of memory banks. The number of the plurality of memory banks is less than a number of the plurality of objects. The circular buffer can include a plurality of hardware locks configured to reserve selected ones of the plurality of memory banks for use by the producer circuit or the consumer circuit. The circular buffer can include a buffer controller coupled to the memory and configured to track a plurality of positions. The plurality of positions can include a consumer bank position, a consumer object position, a producer bank position, and a producer object position. The buffer controller can be configured to allocate selected ones of the plurality of objects from the plurality of memory banks to the producer circuit and to the consumer circuit according to the tracked positions and using the plurality of hardware locks.

In one or more examples, a method can include storing a plurality of objects within a memory coupled to a producer circuit and a consumer circuit. The plurality of objects are stored across a plurality of memory banks of the memory. The number of the plurality of memory banks is less than a number of the plurality of objects. The method can include tracking a plurality of positions using a buffer controller coupled to the memory. The plurality of positions can include a consumer bank position, a consumer object position, a producer bank position, and a producer object position. The method can include allocating, using the buffer controller, selected ones of the plurality of objects from the plurality of memory banks to the producer circuit and to the consumer circuit according to the tracked positions and by controlling a plurality of hardware locks. The plurality of hardware locks are configured to reserve selected ones of the plurality of memory banks for use by the producer circuit or the consumer circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
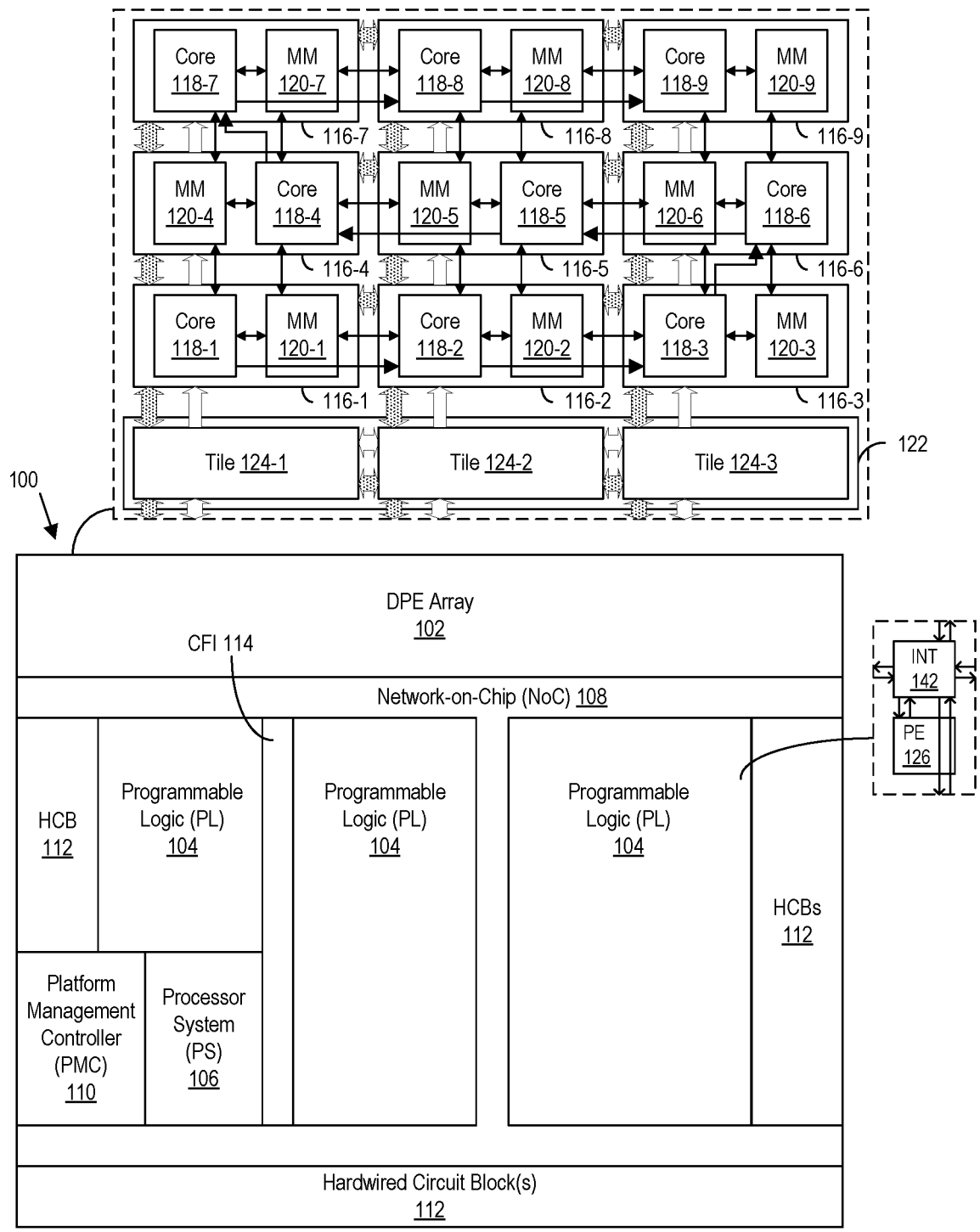
FIG. 1 illustrates an example architecture for an integrated circuit.

This disclosure relates to digital circuits and, more particularly, to circular buffer architectures for communication between producer and consumer data processing elements. In cases where an integrated circuit (IC) includes limited memory resources, implementing an N-element circular buffer can be a complex task. The inventive arrangements described within this disclosure provide methods, systems, and computer program products for implementing an N-element circular buffer despite the limited availability of certain memory resources. The resulting N-element circular buffer may provide guaranteed deadlock free operation so long as certain data access patterns, expressed as constraints, are enforced for the data producer(s) and the data consumer(s) communicating through the N-element circular buffer.

In one or more example implementations, one or more N-element circular buffers (circular buffers) may be implemented within a data processing engine (DPE) array. A DPE array may be implemented as a processor array. The DPE array includes a plurality of DPEs. Each DPE is implemented as a hardened circuit block or tile and may include a core capable of executing program code and a memory module. In some example implementations, the DPE array may include one or more memory tiles, e.g., dedicated memory tiles, that may be interspersed with other tiles such as DPEs of the DPE array. Thus, the DPE array includes memories dispersed throughout the array. Each memory module of a DPE may include M memory banks that may be shared among a plurality of different entities. To facilitate shared access to the memory module, each memory module may include M hardware locks for use in controlling access to the M memory banks contained therein.

Within a processor array architecture such a DPE array, memory resources, in reference to the number of memory banks and/or the number of hardware locks available to implement a given circular buffer, may be limited. For example, term N, as used herein is an integer value of four or more, while the term M is an integer value of three or more where N>M. The inventive arrangements may be used to implement a circular buffer, where the circular buffer is capable of storing N elements and the available memory resources for implementing the circular buffer include only M memory banks and M hardware locks. In this example, the hardware locks are 2-state hardware locks.

The circular buffer may communicatively link a data producer and a data consumer disposed in adjacent DPEs. Within this disclosure, the term "producer (consumer)," "data producer (consumer)," "producer (consumer) data processing element," and "producer (consumer) circuit" are used interchangeably. In one or more other example implementations, a circular buffer may be implemented that communicatively links a data producer and a data consumer disposed in non-adjacent DPEs. In each case, the constraints, in reference to object acquire constraints and/or object release constraints, when implemented by the data producer and the data consumer, provide a deadlock free access schedule and deadlock free operation of the circular buffer.

While described in the context of a DPE array, it should be appreciated that the inventive arrangements may be implemented in any of a variety of circuit architectures and/or ICs where the circular buffer communicatively links one or more data producers and one or more data consumers, is to store a number of elements N, and is to be implemented with limited memory resources M. Further aspects of the inventive arrangements are described below with reference to the figures.

FIG. 1 illustrates an example architecture for an IC 100. IC 100 is an example of a programmable IC and an adaptive system. In one aspect, IC 100 is also an example of a System-on-Chip (SoC). In the example of FIG. 1, IC 100 is implemented on a single die provided within a single integrated package. In other examples, IC 100 may be implemented using a plurality of interconnected dies where the various programmable circuit resources illustrated in FIG. 1 are implemented across the different interconnected dies.

In the example, IC 100 includes DPE array 102, programmable logic (PL) 104, a processor system (PS) 106, a Network-on-Chip (NoC) 108, a platform management controller (PMC) 110, and one or more hardwired circuit blocks 112. A configuration frame interface (CFI) 114 is also included. It should be appreciated that the architecture of IC 100 is provided for purposes of illustration and not limitation. An IC for use with the inventive arrangements described herein may include DPE array 102 alone or in combination with any one or more of the various subsystems described or other types of circuits. Other IC architectures that do not include a DPE array may be used with the inventive arrangements described herein where the IC architecture provides one or more memories that may be used as a circular buffer to couple data processing elements where the memory or memories have a fixed number of available memory banks and/or hardware resources relative to the number of objects to be stored in the circular buffer.

DPE array 102 is implemented as a plurality of interconnected and programmable DPEs 116. DPEs 116 may be arranged in an array. While DPEs 116 are programmable, DPEs 116 are hardened and are not formed of programmable logic. Each DPE 116 can include one or more cores 118 and a memory module (abbreviated "MM" in FIG. 1) 120. In one aspect, each core 118 is capable of executing program code stored in a core-specific program memory contained within each respective core (not shown). Cores 118 may be implemented using any of a variety of different processor architectures such as, for example, vector, single instruction-multiple data (SIMD), reduced instruction set computer (RISC), complex instruction set computer (CISC), or the like.

Each core 118 is capable of directly accessing the memory module 120 within the same DPE 116 and the memory module 120 of any other DPE 116 that is adjacent to the core 118 of the DPE 116 in the up, down, left, and right directions. For example, core 118-5 is capable of directly reading and/or writing (e.g., via respective memory interfaces not shown and without the use of DMA engines) memory modules 120-5, 120-8, 120-6, and 120-2. Core 118-5 sees each of memory modules 120-5, 120-8, 120-6, and 120-2 as a unified region of memory (e.g., as a part of the local memory accessible to core 118-5). This facilitates data sharing among different DPEs 116 in DPE array 102. In other examples, core 118-5 may be directly connected to memory modules 120 in other DPEs.

DPEs 116 are interconnected by programmable DPE interconnect circuitry. The programmable DPE interconnect circuitry may include one or more different and independent networks. For example, the programmable DPE interconnect circuitry may include a streaming network formed of streaming switches (not shown) that establish streaming connections shown with shaded arrows and a memory mapped network formed of memory mapped switches (not shown) that establish memory mapped connections shown with unshaded arrows. Cores 118 may communicate with memory modules 120 and/or other components that are not in adjacent DPEs or in the same DPE 116 by way of communicating through stream switches and/or DMA engines.

Loading configuration data into configuration registers of DPEs 116 by way of the memory mapped connections allows each DPE 116 and the components therein to be controlled independently. DPEs 116 may be enabled/disabled on a per-DPE basis. Each core 118, for example, may be configured to access the memory modules 120 as described or only a subset thereof to achieve isolation of a core 118 or a plurality of cores 118 operating as a cluster based on the particular memory modules each respective core is able to access. Each streaming connection may be configured to establish logical connections between only selected ones of DPEs 116 to achieve isolation of a DPE 116 or a plurality of DPEs 116 operating as a cluster. Because each core 118 may be loaded with program code specific to that core 118, each DPE 116 is capable of implementing one or more different kernels therein.

In other aspects, the programmable DPE interconnect circuitry within DPE array 102 may include additional independent networks such as a debug network and/or an event broadcast network, each being independent (e.g., distinct and separate from) the streaming connections and the memory mapped connections. In some aspects, the debug network is formed of memory mapped connections and/or is part of the memory mapped network.

Cores 118 may be directly connected with adjacent cores 118 via core-to-core cascade connections. In one aspect, core-to-core cascade connections are unidirectional and direct connections between cores 118 as pictured. In another aspect, core-to-core cascade connections may be bidirectional and direct connections. In still another aspect, core-to-core cascade connections, whether unidirectional or bidirectional, may be created between two or more cores 118. In general, core-to-core cascade connections allow the results stored in an accumulation register, e.g., in intermediate result of an operation performed by a core, of a source core to be provided directly to an input of a target or load core for operation thereon. Activation of core-to-core cascade connections may be controlled by loading configuration data into the configuration registers of the respective DPEs 116.

In an example implementation, DPEs 116 do not include cache memories. By omitting cache memories, DPE array 102 is capable of achieving predictable, e.g., deterministic, performance. Further, significant processing overhead is avoided since maintaining coherency among cache memories located in different DPEs 116 is not required. In a further example, cores 118 do not have input interrupts. Thus, cores 118 are capable of operating uninterrupted. Omitting input interrupts to cores 118 also allows DPE array 102 to achieve predictable, e.g., deterministic, performance.

SoC interface block 122 operates as an interface that connects DPEs 116 to other resources of IC 100. In the example of FIG. 1, SoC interface block 122 includes a plurality of interconnected tiles 124 organized in a row. In particular embodiments, different architectures may be used to implement tiles 124 within SoC interface block 122 where each different tile architecture supports communication with different resources of IC 100. Tiles 124 are connected so that data may be propagated from one tile to another bi-directionally. Each tile 124 is capable of operating as an interface for the column of DPEs 116 directly above and is capable of interfacing such DPEs 116 with components and/or subsystems of IC 100 including, but not limited to, PL 104 and/or NoC 108.

Tiles 124 are connected to adjacent tiles, to DPEs 116 immediately above, and to circuitry below using the streaming connections and the memory mapped connections as shown. Tiles 124 may also include a debug network that connects to the debug network implemented in DPE array 102. Each tile 124 is capable of receiving data from another source such as PS 106, PL 104, and/or another hardwired circuit block 112. Tile 124-1, for example, is capable of providing those portions of the data, whether application or configuration, addressed to DPEs 116 in the column above to such DPEs 116 while sending data addressed to DPEs 116 in other columns on to other tiles 124, e.g., 124-2 or 124-3, so that such tiles 124 may route the data addressed to DPEs 116 in their respective columns accordingly.

PL 104 is circuitry that may be programmed to perform specified functions. As an example, PL 104 may be implemented as field programmable gate array type of circuitry. PL 104 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 104 is highly configurable unlike hardened circuitry. Each programmable circuit block of PL 104 typically includes a programmable element 126 (e.g., a functional element) and a programmable interconnect 142. The programmable interconnects 142 provide the highly configurable topology of PL 104. The programmable interconnects 142 may be configured on a per wire basis to provide connectivity among the programmable elements 126 of programmable circuit blocks of PL 104 and is configurable on a per-bit basis (e.g., where each wire conveys a single bit of information) unlike connectivity among DPEs 116, for example, that may include multi-bit stream connections capable of supporting packet-based communications.

PS 106 is implemented as hardened circuitry that is fabricated as part of IC 100. PS 106 may be implemented as, or include, any of a variety of different processor types capable of executing program code. For example, PS 106 may be implemented as an individual processor, e.g., a single core capable of executing program code. In another example, PS 106 may be implemented as a multi-core processor. In still another example, PS 106 may include one or more cores, modules, processors and/or co-processors, I/O interfaces, and/or other resources. PS 106 may be implemented using any of a variety of different types of architectures. Though PS 106 may include multiple cores and/or processors, PS 106 is not considered an "array." Example architectures that may be used to implement PS 106 may include, but are not limited to, vector, SIMD, RISC, and/or CISC. Example implementations of PS 106 may include one or more ARM processors, x86 processors (IA-32, IA-64, etc.), graphics processing units (GPUs), processors using the Power Architecture, mobile processors, DSPs, or combinations of the foregoing architectures and/or examples.

NoC 108 is a programmable interconnecting network for sharing data between endpoint circuits in IC 100. The endpoint circuits can be disposed in DPE array 102, PL 104, PS 106, and/or selected hardwired circuit blocks 112. NoC 108 can include high-speed data paths with dedicated switching. In an example, NoC 108 includes one or more horizontal paths, one or more vertical paths, or both horizontal and vertical path(s). The arrangement and number of regions shown in FIG. 1 is merely an example. NoC 108 is an example of the common infrastructure that is available within IC 100 to connect selected components and/or subsystems.

Within NoC 108, the nets that are to be routed through NoC 108 are unknown until a user circuit design is created for implementation within IC 100. NoC 108 may be programmed by loading configuration data into internal configuration registers that define how elements within NoC 108 such as switches and interfaces are configured and operate to pass data from switch to switch and among the NoC interfaces to connect the endpoint circuits. NoC 108 is fabricated as part of IC 100 (e.g., is hardwired) and, while not physically modifiable, may be programmed to establish connectivity between different master circuits and different slave circuits of a user circuit design. NoC 108, upon power-on, does not implement any application data paths or routes therein, but may provide default paths for loading configuration data into selected other subsystems. Once configured by PMC 110, however, NoC 108 implements data paths or routes between endpoint circuits.

PMC 110 is responsible for managing IC 100. PMC 110 is a subsystem within IC 100 that is capable of managing the other programmable circuit resources across the entirety of IC 100. PMC 110 is capable of maintaining a safe and secure environment, booting IC 100, and managing IC 100 during normal operations. For example, PMC 110 is capable of providing unified and programmable control over power-up, boot/configuration, security, power management, safety monitoring, debugging, and/or error handling for the different programmable circuit resources of IC 100 (e.g., DPE array 102, PL 104, PS 106, and NoC 108). PMC 110 operates as a dedicated platform manager that decouples PS 106 from PL 104. As such, PS 106 and PL 104 may be managed, configured, and/or powered on and/or off independently of one another.

Hardened circuit blocks 112 include special-purpose circuit blocks fabricated as part of IC 100. Though hardened, hardened circuit blocks 112 may be configured by loading configuration data into control registers to implement one or more different modes of operation. Examples of hardened circuit blocks 112 may include input/output (I/O) blocks, transceivers for sending and receiving signals to circuits and/or systems external to IC 100, memory controllers, or the like. Examples of different I/O blocks may include single-ended and pseudo differential I/Os. Examples of transceivers may include high-speed differentially clocked transceivers. Other examples of hardened circuit blocks 112 include, but are not limited to, cryptographic engines, digital-to-analog converters (DACs), analog-to-digital converters (ADCs), and memories such as Random-Access Memory (RAM, e.g., double data rate synchronous dynamic RAM or DDR SDRAM), High Bandwidth Memory (HBM), or the like. In general, hardwired circuit blocks 112 are application-specific circuit blocks.

CFI 114 is an interface through which configuration data, e.g., a configuration bitstream, may be provided to PL 104 to implement different user-specified circuits and/or circuitry therein. CFI 114 may be coupled to and accessible by PMC 110 to provide configuration data to PL 104. In some cases, PMC 110 is capable of first configuring PS 106 such that PS 106, once configured by PMC 110, may provide configuration data to PL 104 via CFI 114.

The various programmable circuit resources illustrated in FIG. 1 may be programmed initially as part of a boot process for IC 100. During runtime, the programmable circuit resources may be reconfigured. In one aspect, PMC 110 is capable of initially configuring DPE array 102, PL 104, PS 106, and NoC 108. At any point during runtime, PMC 110 may reconfigure one or more or all or portions of DPE array 102, PL 104, PS 106, and NoC 108. In some cases, PS 106 may configure and/or reconfigure PL 104 and/or NoC 108 once initially configured by PMC 110.

Figure 2:
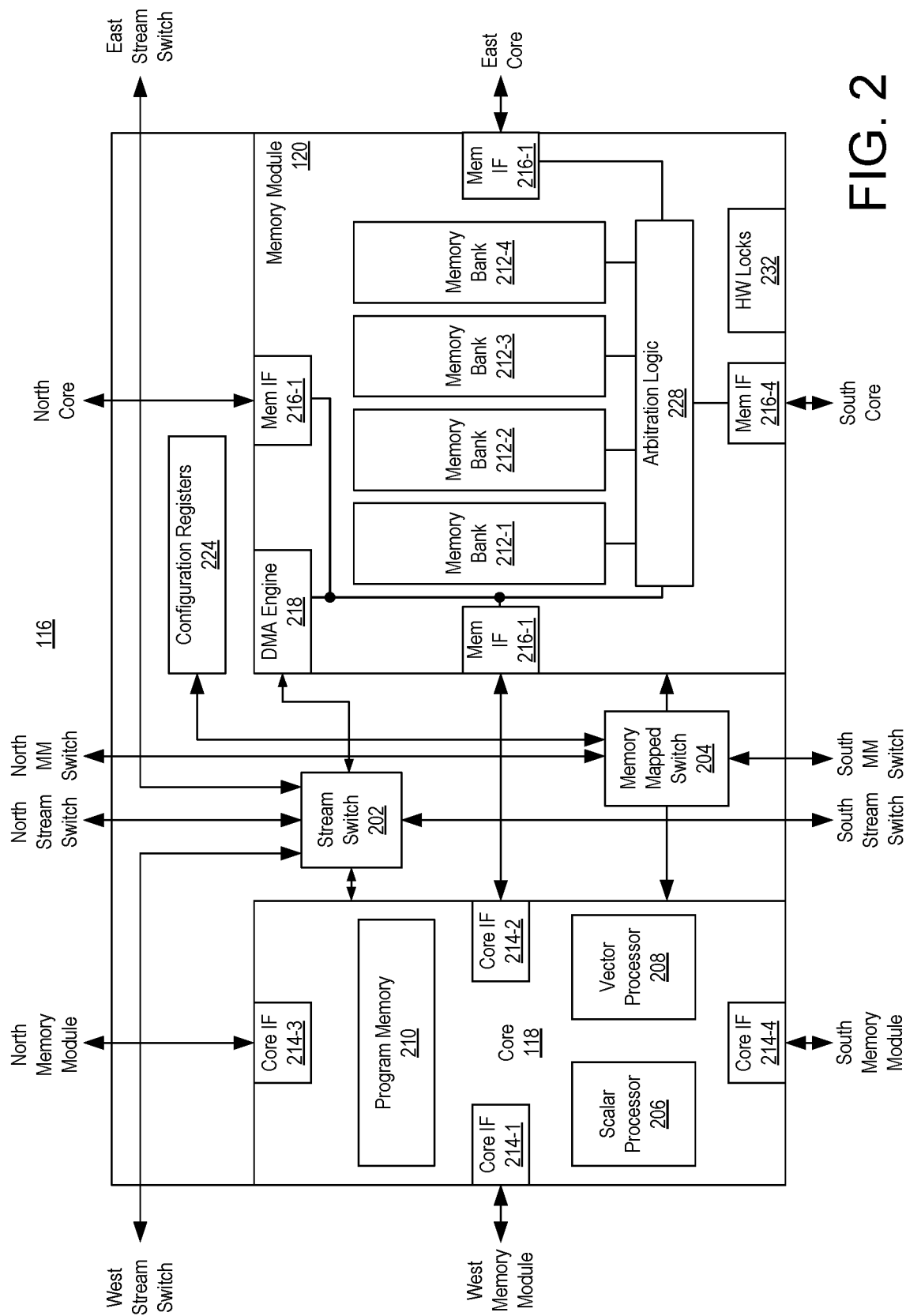
FIG. 2 illustrates an example architecture for a data processing engine (DPE) of a DPE array.

FIG. 2 illustrates an example architecture for a DPE 116 of DPE array 102. In the example of FIG. 2, DPE 116 includes a core 118, a memory module 120, and a DPE interconnect formed of a stream switch 202 and a memory mapped switch 204.

In the example of FIG. 2, stream switch 202 is connected to a stream switch in adjacent tiles (e.g., DPEs or other circuit blocks) in the north, south, east, and west directions as shown. Memory mapped switch 204 is connected to the memory mapped switch in adjacent tiles (e.g., DPEs or other circuit blocks) in the north and south directions as shown. In general, memory mapped switches support configuration of DPEs 116 by loading configuration data into configuration registers 224 and program instructions into program memory 210. Stream switches 202 convey application data including data consumed by and/or generated by cores 118 and/or data stored in memory modules 120 at runtime. It should be appreciated that any register, whether control, configuration, and/or memory module 120 of a DPE 116 may be addressed (e.g., read and/or written) via memory mapped switch 204.

Core 118 provides the data processing capabilities of DPE 116. In one aspect, core 118 may be implemented as a very-long instruction word (VLIW) processor with single instruction multiple data (SIMD) vector units that are optimized for compute-intensive applications that may include, but are not limited to, digital signal processing (DSP), 5G wireless applications, and artificial intelligence such as machine learning (ML). DPE array 102 supports various types of parallel operation. Because core 118 supports VLIW, each core 118 may execute multiple operations in a single clock cycle. Core 118 may include vector registers that allow multiple elements to be computed in parallel. Further, the various cores 118 of DPE array 102 are capable of executing in parallel. In the example, core 118 is capable of executing a scalar operation, up to two moves, two vector reads (loads), one vector write (store), and one vector instruction per clock cycle. In this regard, core 118 may include multiple processors such as a scalar processor 206 and a vector processor 208.

Core 118 further includes a program memory 210. Program memory 210 is capable of storing instructions that are executed by core 118. Though described as including a scalar processor and a vector processor, in other example implementations, core 118 may include any of a variety of processor architectures such as one or more central processing units (CPUs), one or more graphics processing units (GPUs), one or more DSPs, one or more vector processors, one or more scalar processors, or any combination thereof. Program memory 210 may be implemented as a dedicated program memory that is private to core 118. That is, program memory 210 may only be used by the core of the same DPE 116. Thus, program memory 210 may only be accessed by core 118 and is not shared with any other DPE or component of another DPE. Program memory 210 is addressable via memory mapped switch 204.

Core 118 also includes a plurality of core interfaces 214. Each core interface 214 is capable of connecting to a memory interface 216 in either the same DPE 116 or in a different and adjacent tile (e.g., DPE in the east, west, north, and/or south directions). In the example of FIG. 2, north, west, and south memory modules are disposed in different adjacent DPEs while the east memory module is disposed memory module 120 located in the same DPE as core 118.

In the example, memory module 120 includes a plurality of memory banks 212, a plurality of memory interfaces 216, a DMA engine 218, arbitration logic 228, and a plurality of hardware locks 232. Memory module 120 is capable of storing data that is used by and/or generated by core 118 during runtime. For example, memory module 120 is capable of storing application data. Memory module 120 may be implemented as a read/write memory such as a random-access memory including memory banks 212-1, 212-2, 212-3, and 212-4. Memory banks 212 are coupled to arbitration logic 228, which connects to each of memory interfaces 216. In this example, with four memory banks, the term M=4. It should be appreciated, however, that the particular number of memory banks 212 included in memory module 120 is for purposes of illustration and that memory module 120 may include fewer or more memory banks 212 than shown. Accordingly, memory module 120 is capable of storing data that may be read and consumed by core 118. Memory module 204 is also capable of storing data (e.g., results) that are written by core 118.

DMA engine 218 may include one or more stream-to-memory mapped interfaces to send and receive data as data streams via stream switch 202 to read and write data to and/or from memory banks 212 using memory mapped transactions. In the example, each memory module 120 includes one hardware lock 232 for each memory bank 212 contained therein. Each of the M hardware locks 232, in the example of FIG. 2, may be a 2-state hardware lock. The hardware locks 232 are used to give ownership of, or reserve, the different memory banks 212 to different requesting entities such as data producer(s) and/or data consumer(s) and as such, synchronize access by a plurality of cores 118 and/or DMAs 218 to memory banks 212.

Each core capable of accessing memory module 120, for example, may access hardware locks 232 to request and acquire a lock prior to accessing a particular portion of memory in memory module 204 and subsequently release the lock so as to allow another core or entity to access the portion of memory once that entity acquires a lock. Hardware locks 232 effectively manage operation of memory module 120 as a shared memory between DPEs by regulating and synchronizing access to the memory banks 212.

In the example of FIG. 2, each memory interface 216 is connected to a core interface 214. In the example of FIG. 2, north, south, and east cores are disposed in different adjacent DPEs while the west core is disposed memory module 120 located in the same DPE as core 118. As such, each memory module 120 is capable of storing data, e.g., application data, that may be used by and/or generated by one or more other cores of other DPEs within the DPE array 102. One or more other cores of DPEs may also read from and/or write to memory module 120 in the example of FIG. 2 via the memory interfaces 216.

Thus, a core in one DPE may read and/or write directly to the memory module in the same DPE and to the memory module of three adjacent DPEs. The term "directly," in reference to core-to-memory module accesses, means that the core may access (e.g., read or write) the memory bank of a memory module without utilizing a DMA engine and/or a stream switch. The read and/or write transaction occurs directly between a core interface 214 and a connected memory interface 216. A core 118 may also read from and/or write to a memory module of another non-adjacent DPE by way of DMA engine 218 and one or more interconnected stream switches 202. For example, if the example DPE 116 of FIG. 2 is DPE 116-5 of FIG. 1, DPEs 116-8, 116-6, 116-2, and 116-4 are considered adjacent DPEs. Core 118 of DPE 116-5 is capable of reading and writing directly to memory module 120-5, 120-6, 120-8, and 120-2.

Figure 3:
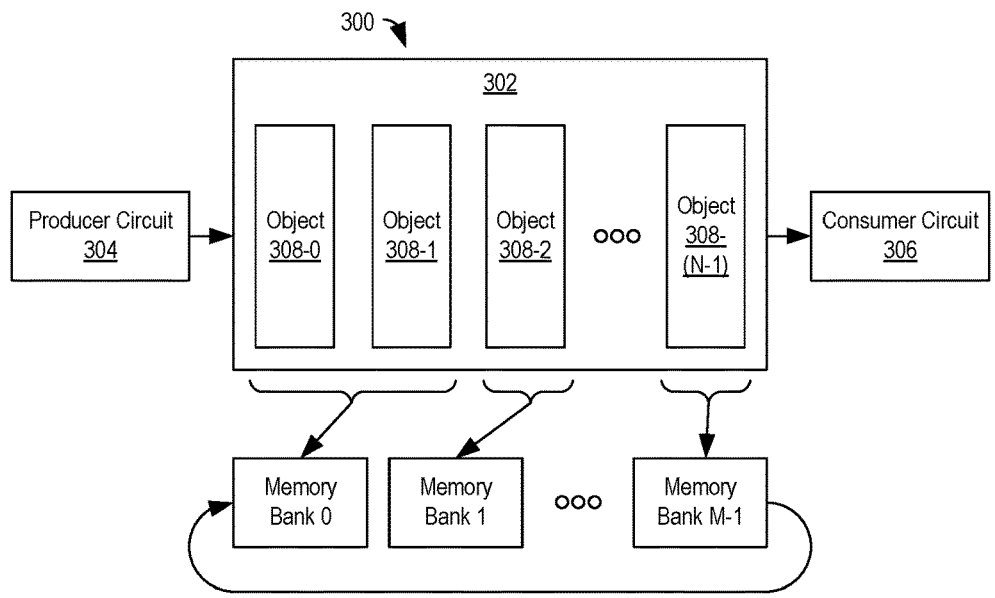
FIG. 3 illustrates an example of a circular buffer communicatively linking a producer circuit and a consumer circuit.

FIG. 3 illustrates an example of a circular buffer 300 communicatively linking a producer circuit 304 and a consumer circuit 306. In an example, producer circuit 304 may be implemented as a core 118 of a first DPE, while consumer circuit 306 is implemented as a core 118 of a second DPE. The first and second DPEs may be adjacent.

In the example, circular buffer 300 includes a memory 302. Circular buffer 300 may be implemented using a memory module 120 of either the first core or the second core. Memory 302 is capable of storing a plurality, e.g., "N," objects 308. The portions of memory 302 that are capable of storing objects may be referred to as "containers." Within this disclosure, reference to an object stored in a circular buffer may also reference the particular container of the memory that stores the object. Thus, a producer may acquire some number of containers, generate objects that are stored in the containers, and release some number of objects for use by the consumer, where each released object corresponds to one released container. Similarly, a consumer may acquire one or more objects and the corresponding containers, consumer the objects, and release the objects that were consumed thereby releasing the containers used to store the consumed objects. A circular buffer capable of storing N objects has N containers. An object can be any data structure suited for a particular application domain. The producer circuit 304 and the consumer circuit 306 operate by each acquiring exclusive access to one or more (e.g., a subset) of objects 308 within circular buffer 300.

For purpose of illustration, the memory 302 in which the circular buffer 300 is implemented includes fewer memory banks, e.g., M memory banks, than objects. Though not shown, the memory may include a number of hardware locks M corresponding to the number of memory banks. In such a configuration, where the number of available memory banks is less than the number of objects supported or stored in the circular buffer, each memory bank must store two or more objects.

In general, at the start of an execution iteration for a producer or a consumer, several objects need to be acquired. If all required objects are available to the requesting entity, the entity may begin or continue execution of that iteration. Otherwise, the execution is stalled until the required objects become available to the requesting entity. At the end of the execution iteration, a specified number of objects can be released. For example, at the end of the execution iteration, the entity may release none of the acquired objects, one or more of the acquired objects, or all of the acquired objects. An acquired object that is not released at the end of the execution iteration remains, or is, available to the entity for a next execution iteration and, as such, implements data reuse. The term "iteration cycle" refers to a plurality of execution iterations.

Referring to the example of FIG. 3, each of the producer circuit 304 and the consumer circuit 306 may acquire a number of containers for exclusive use and then release one or more of such containers to the other side. When a container is not released, that container remains available to the acquiring entity thereby enabling date re-use. For example, referring to producer circuit 304 as the "producer" or "P" and consumer circuit 306 as the "consumer" or "C," the producer may acquire n objects (e.g., containers), where $n=a_p(i)$ at the start of an execution iteration i, where n<N to provide the necessary space for production of the n objects. Within this disclosure, the notation a represents acquisition of one or more buffers where the subscript indicates the producer or the consumer. Similarly, the notation r represents release of one or more buffers where the subscript again indicates producer or consumer.

For as long as fewer than n containers are available to the producer, back pressure is exerted and producer circuit 304 remains stalled. Once the n containers are available, producer circuit 304 may continue execution with full read and/or write access to all n containers. At the end of the execution iteration, producer circuit 304 releases m objects, where $m=r_p(i)$, with 0≤m≤n. The release of the m objects (e.g., m containers) makes the m objects available to the consumer circuit 306. When m<n, n−m containers are available to the next execution iteration of the producer circuit 304, thereby enabling partial data production within the containers. That is, the data for an object stored in a container may be created by the producer circuit 304 over multiple execution iterations.

Similarly, consumer circuit 306 may acquire k, objects, where $k=a_c(i)$, for full read and/or write access. The consumer circuit 306 can only proceed with the execution iteration if the k objects are available (e.g., have been produced by the producer circuit 304). At the end of the execution iteration, the consumer circuit 306 can release l objects, where $l=r_c(i)$ and $0 \le l \le k$, back to producer 304. When l<k, k−l objects remain available to the consumer circuit 306 for the next execution iteration, thereby enabling data reuse. Initially, e.g., at startup, all objects are available for the producer circuit 304 and no objects are available for the consumer circuit 306. Objects only become available to the consumer circuit 306 after the producer circuit 304 releases such objects.

For purposes of illustration, consider an example where the producer circuit 304 and the consumer circuit 306 are part of a filter that performs a 2-dimensional convolution that applies a 3×3 filter kernel to an input image of width W and height H. If the filter is operative on a line basis, the objects stored in the circular buffer 300 are lines of width W. A total of H execution iterations are needed to process all lines in the H×W image.

In steady state, the filter needs 3 lines to meet the neighborhood requirements of the 3×3 filter kernel. Having a circular buffer capable of holding 4 lines (e.g., 4 objects so that N=4) is sized to enable concurrent execution of a producer capable of generating one line at the time in the circular buffer for the consumer. At the top of the image being processed, assuming the filter has internal support for border extension, only 2 lines are needed.

Accordingly, for execution iteration 0, $a_c(0)=2$. The same is true for the bottom of the image where $a_c(H-1)=2$. For all internal lines of the image, 3 lines are needed. Accordingly, $a_c(1, \ldots, H-2)=3$. To exploit vertical data re-use between consecutive lines, the filter only releases those lines that are no longer needed. For example, after processing the first line, both acquired lines can be reused during the next execution iteration such that $r_c(0)=0$. For the lines 1 through H−2, still 2 lines can be reused during the next execution iteration such that only a single line is released, where $r_c(1, \ldots, H-2)=1$. At the bottom of the image, both acquired lines need to be released such that $r_c(H-1)=2$.

Referring again to the example of FIG. 3, in cases where memory resources are limited, e.g., in a DPE array or other processor array with interspersed memory, the circular buffer 300 may be implemented on the condition that certain acquire and/or release constraints, as described herein, are met. The limited memory resources means that multiple objects must be assigned to each of the memory banks. The number of memory banks available and the number of hardware locks available is less than the number of objects that the circular buffer is capable of holding. In cases where M=2, only ping-pong behavior can be implemented. In cases where M>2, however, a circular buffer may be implemented.

Figure 4:
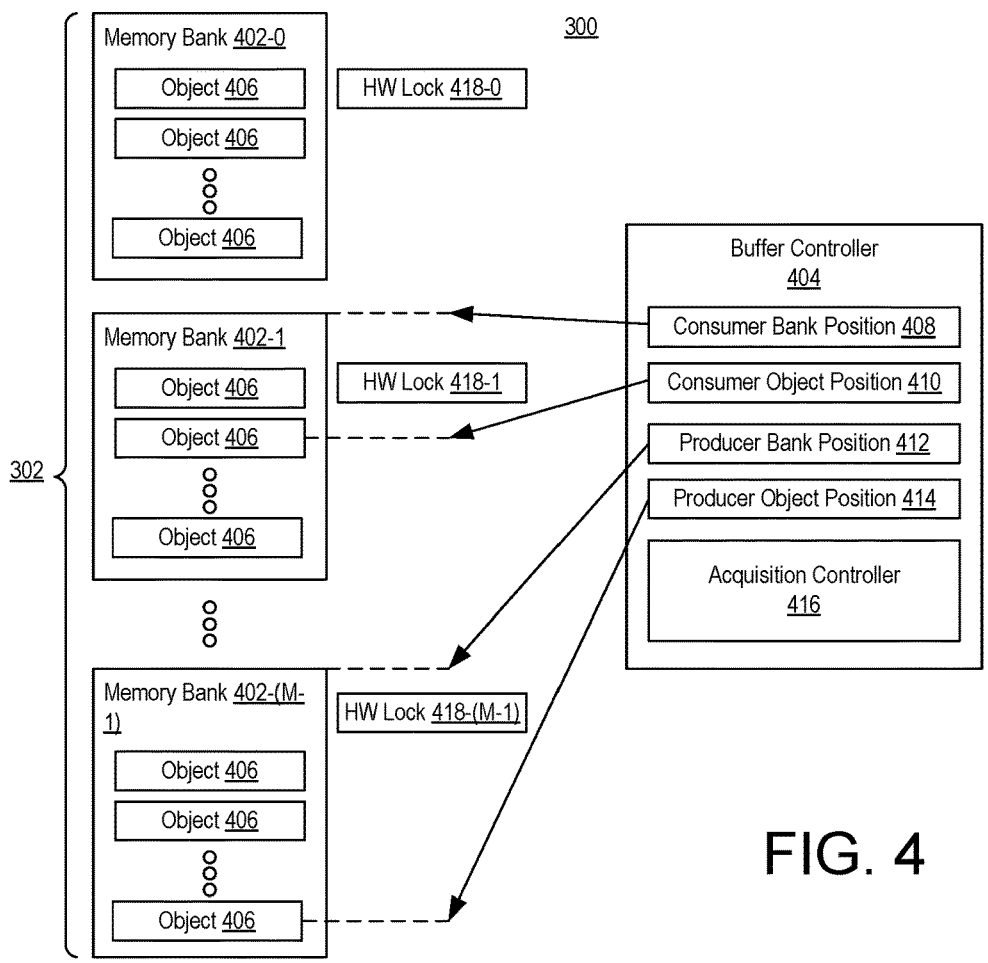
FIG. 4 illustrates another example implementation of a circular buffer in accordance with the inventive arrangements described within this disclosure.

FIG. 4 illustrates another example implementation of circular buffer 300 in accordance with the inventive arrangements described within this disclosure. In the example of FIG. 4, circular buffer 300 includes a plurality of memory banks 402-1 through 402-(M−1) and a buffer controller 404. Memory banks 402 may be included in memory 302.

In an example implementation, buffer controller 404 is implemented using cores 118. That is, buffer controller 404 may be implemented as program code executed by one or more processors, e.g., the scalar processor 206, of cores 118 operating as the producer and the consumer. As an example, buffer controller 404 may be implemented through compilation of the producer and the consumer program code and implemented as the control program code within each respective entity. The producer and consumer, by way of the control program code in each respective entity, may maintain relevant position information, implement relevant acquisition controller 416 functions in each respective entity, and communicate through shared hardware locks 418. For example, producer control program code may implement producer bank position 412 and producer object position 414 and implement acquisition controller 416 functions to acquire and release memory banks via hardware locks 418. Similarly, consumer control program code may implement consumer bank position 408 and consumer object position 410 and implement acquisition controller 416 functions to acquire and release memory banks 402 via hardware locks 418.

In one or more other example implementations, buffer controller 404 may be implemented as a hardened and dedicated circuit block that is implemented within a DPE of the DPE array. For example, the buffer controller 404 may be implemented as an additional circuit block included in a DPE and/or in the core of a DPE. As a centralized and hardened buffer controller 404, the buffer controller 404 may manage hardware locks 418 on behalf of the producer and the consumer (e.g., responsive to acquisition and release requests from the respective entities).

Each memory bank 402 is capable of storing a plurality of objects 406. For purposes of discussion, the number of objects that are combined in a single memory bank is called the coarse size (c). Thus, each of memory banks 402 may include c objects. Since there are M memory banks and M hardware locks, only a single hardware lock 418 is used per memory bank 402.

Buffer controller 404 is capable of tracking two positions for the consumer and two positions for the producer. For example, buffer controller 404 may include a plurality of registers or memory locations, depending on the implementation, labeled with the particular data item each is configured to store. Thus, buffer controller 404 can include a consumer bank position 408, a consumer object position 410, a producer bank position 412, a producer object position 414, an acquisition controller 416, and a plurality of hardware locks 418.

The bank positions 408 and 412 operate with a bank granularity. For example, consumer bank position 408 advances circularly in response to all objects in the memory bank 402 indicated by consumer bank position 408 having been released by the consumer. Producer bank position 412 advances circularly in response to all objects in the memory bank 402 indicated by producer bank position 412 having been released by the producer. As a bank position is advanced, the hardware locks corresponding to the respective banks are updated accordingly. In the case of 2-state hardware locks, each hardware lock 418 indicates that the buffer is allocated to either the producer or to the consumer. Within this disclosure, the terms "acquired," "reserved," and "allocated" refer to designating an object for use by a particular entity such as a consumer or a producer. For example, one state such as the lock (unlock) state indicates allocation to the producer, while the other state, e.g., the unlock (lock) state, indicates allocation to the consumer. The hardware locks 418, which operate with a memory bank granularity, are used to exert back pressure with a bank granularity.

The object positions 410 and 414 work at an object granularity. The consumer object position 410 advances circularly based on the number of objects released by the consumer. Similarly, the consumer object position 414 advances circularly based on the number of objects released by the producer.

In one or more examples, acquisition controller 416 is capable of monitoring the acquisition and/or release of objects 406 by the producer and the consumer and updating the consumer bank position 408, consumer object position 410, producer bank position 412, and producer object position 414 (also collectively referred to herein as "position information") accordingly. Based on the position information, acquisition controller 416 is capable of allocating objects to the producer and/or the consumer in response to requests for such objects from the respective entities. Acquisition controller 416, for example, may determine which objects are available to the producer and/or to the consumer (e.g., the next object in order in the circular buffer based on the position data) in response to requests for object(s) from the respective entities and pass a pointer to any object(s) allocated to the producer and/or consumer as the case may be.

In one aspect, acquisition controller 416 is capable of allocating available objects and/or memory banks to requesting entities (e.g., the producer and/or consumer) as requested by the requesting entities. The acquisition controller 416, however, may not enforce acquisition and/or release constraints, but rather monitor for violations and generate flags and/or interrupts in response to detecting a violation of a constraint. For example, acquisition controller 416 is capable of monitoring the acquisition and/or release of objects 406 by the producer and the consumer using consumer bank position 408, consumer object position 410, producer bank position 412, and producer object position 414. In response to detecting a violation of an acquisition and/or release constraint by one or both of the producer and consumer, the acquisition controller 404 is capable of generating a notification or flag indicating that behavior of the producer and/or consumer, as the case may be, violates the acquisition and/or release constraints and may lead to a deadlock condition. Thus, if the requesting entity requests more objects than permitted, acquisition controller 416 may return the number of objects requested (presuming such number of objects are available), despite that number exceeding the number allowed by the constraints, but also generate a flag or interrupt indicating that the conditions for deadlock free operation have been violated. This example implementation may be suitable for cases where the producer and consumer may operate with dynamic data rates or data dependent acquire and release patterns.

In another example implementation, acquisition controller 416 is capable of allocating objects 406 to requesting entities (e.g., the producer and/or consumer) to conform with the acquisition and/or release constraints described herein. That is, the acquisition controller 416 is capable of enforcing the constraints by only allocating objects and/or memory banks to requesting entities so that the allocated objects and/or memory banks conform with the established constraints to avoid deadlock conditions. For example, acquisition controller 416 is capable of monitoring the acquisition and/or release of objects 406 by the producer and the consumer using consumer bank position 408, consumer object position 410, producer bank position 412, and producer object position 414. In response to a request for a particular number of objects from the producer and/or consumer, the acquisition controller 404 only provides the number of objects up to the amount permitted by the constraints to each respective requesting entity for each execution iteration. Thus, if the requesting entity requests more objects than permitted, acquisition controller 416 returns only the permitted number of objects presuming that such number of objects are available. This example implementation also may be suitable for cases where the producer and consumer may operate with dynamic data rates or data dependent acquire and release patterns.

In one or more examples, the producer and consumer may be implemented to follow the acquisition and/or release constraints described within this disclosure. That is, the producer and consumer may be designed to conform with the constraints described herein to avoid deadlocks during operation. Accordingly, the producer and consumer may be configured to only request up to the permitted number of objects from buffer controller 404 for each execution iteration. In that case, acquisition controller 416 may provide the requested number of buffers to the requesting entities based on the tracking performed using the position information. Still, it should be appreciated that monitoring functionality previously described also may be implemented where the acquisition controller 416 generates a flag or interrupt in response to detecting that the constraint(s) have been violated.

Figure 5:
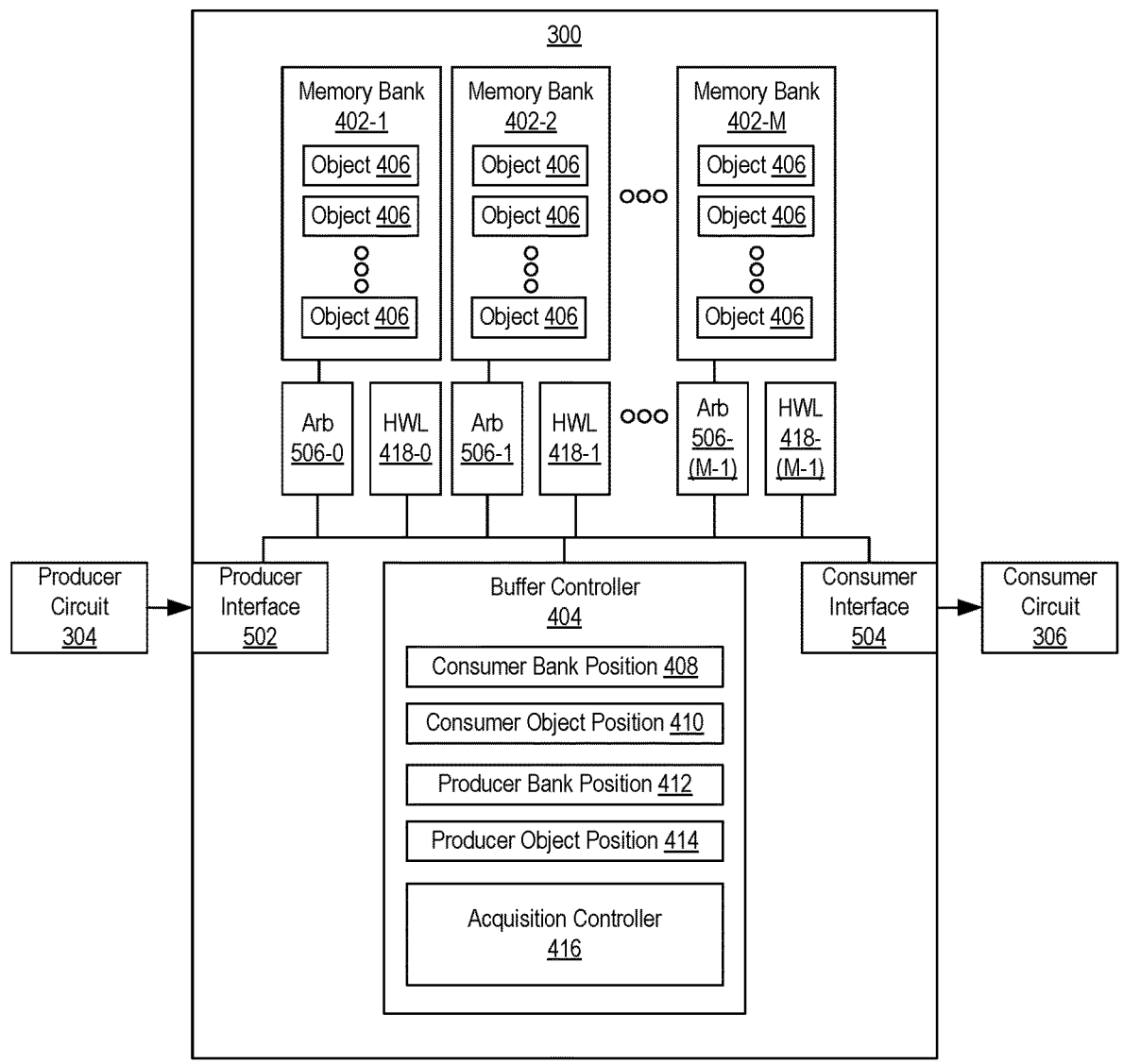
FIG. 5 illustrates another example implementation of a circular buffer in accordance with the inventive arrangements described within this disclosure.

FIG. 5 illustrates another example implementation of circular buffer 300 in accordance with the inventive arrangements described within this disclosure. More particularly, FIG. 5 illustrates an example of the circular buffer of FIG. 4 in greater detail. In the example of FIG. 5, circular buffer 300 includes memory banks 402, buffer controller 404, a producer interface 502, a consumer interface 504, arbitration circuits 506, and hardware locks 418. Producer circuit 304 is coupled to the producer side of circular buffer 300 through producer interface 502 while consumer circuit 306 is coupled to the consumer side of circular buffer 300 through consumer interface 504.

Producer interface 502 and consumer interface 504 only expose, or provide, object granularity to producer circuit 304 and to consumer circuit 306, respectively. That is, via the producer interface 502, producer circuit 304 is able to obtain object information such as pointers to objects and to read and/or write to allocated objects. Producer circuit 304 is not provided with information as to which memory banks have been allocated to the producer. Similarly, via the consumer interface 504, consumer circuit 306 is able to obtain object information such as pointers to objects and to read and/or write to allocated objects. Consumer circuit 306 is not provided with information as to which memory banks have been allocated to the consumer. As such, to producer circuit 304 and consumer circuit 306, circular buffer 300 appears as a generic object First-In-First-Out (FIFO) where the respective producer and consumer circuits need only access objects via the pointers without reference to, or awareness of, a particular memory bank. Internally, e.g., in buffer controller 404, circular buffer 300 tracks memory bank allocation and object position for producer circuit 304 and consumer circuit 306 to control hardware locks 418.

Buffer controller 404 is capable of mapping or correlating the acquisition and release of objects in memory banks 402 from the object level to the memory bank level to coordinate control of the hardware locks 418. Buffer controller 404 further maintains the necessary states to track how many objects 406 a given memory bank 402 has already released to synchronize and correlate the memory bank availability (e.g., at the memory bank level) to the object level so that back pressure may be exerted as producer circuit 304 and consumer circuit 306 issue requests to acquire new objects.

The bank level synchronization managed by buffer controller 404 using hardware locks 418 provides a static mechanism to avoid memory bank conflicts since entire memory banks are either reserved to the producer circuit 304 or to the consumer circuit 306 (e.g., using a 2-state lock). This presumes that each of the producer circuit 304 and the consumer circuit 306 execute tasks that do not trigger memory bank conflicts internally. Memory bank conflicts, e.g., such as those that arise from execution of concurrent tasks, can be resolved dynamically but cause stalls in the execution pipeline.

Since each hardware lock 418 is used to guard c objects of a single memory bank, hardware locks 418 are updated to provide memory bank granularity in terms of memory bank allocation. Due to the hardware locks 418 providing bank granularity, additional constraints are applied to the acquire and/or release patterns of the producer circuit 304 and the consumer circuit 306 to ensure that no conflicts occur at the object level thereby guaranteeing the implementation of a dead-lock free schedule and deadlock-free operation of circular buffer 300.

Assume the producer has $L_P$ execution iterations in an iteration cycle while the consumer has $L_C$ execution iterations. The number of objects released during the producer's iteration cycle needs to be equal to the number objects released during the consumer's iteration cycle. This may be expressed as $\Sigma_{L_P} r_P(i) = \Sigma_{L_C} r_C(i)$. Additionally, since hardware locks 418 operate at a coarse size c granularity, the total number of releases r in an iteration cycle, either at the producer side or at the consumer side, needs to be a multiple of the coarse size such that $\Sigma_{L_P} r_P(i) = \alpha \times c$ and $\Sigma_{L_C} r_C(i) = \beta \times c$, where $\alpha$ and $\beta$ are positive integers. For a deadlock free schedule to exist, where the hardware locks operate at the coarse size c, the maximum number of objects $a_{max}$ that a producer or a consumer acquires during an execution iteration i needs to be restricted.

In accordance with the inventive arrangements described herein, for a single producer and a single consumer, there are three different cases that can be defined using constraints specifying the maximum number of objects that a producer and a consumer can acquire per execution iteration that ensure that the resulting schedule is deadlock free.

Table 1 below illustrates the three combinations of producer and consumer acquisition constraints that result in a deadlock free schedule. Within Table 1, the term K represents the maximum number of banks reserved for the producer and $1 \leq K \leq M-2$. As discussed, the term M represents the number of memory banks available to implement the circular buffer. The term M also represents the number of 2-state hardware locks available. The term c represents the number of objects that must be stored in each memory bank and is determined as N/M rounded up to the next integer. For example, where N=4 and M=3, N/M=1.33, and when rounded up to the next integer c=2. Accordingly, each memory bank will store 2 objects. Case 3 below may require a deadlock exception mechanism.

TABLE 1

| Case | Producer/Consumer | Constraint |
|---|---|---|
| 1 | Producer | $a_{max, P} = (K - 1) \times c + 1$ |
|   | Consumer | $a_{max, C} = (M - K) \times c$ |
| 2 | Producer | $a_{max, P} = K \times c$ |
|   | Consumer | $a_{max, C} = (M - K - 1) \times c$ |
| 3 | Producer | $a_{max, P} = (K - 1) \times c + \min(2, c)$ |
|   | Consumer | $a_{max, C} = (M - K) \times c$ |

In the examples illustrated in Table 1 and with reference to the example circuit architectures of FIGS. 1 and 2, at least two memory banks are reserved for the consumer. Such is the case as the cores 118 may have asymmetric load store capabilities in which each core 118 includes two vector load units and one vector store unit. This means that a consumer implemented in a DPE is able to load more data, e.g., more objects, than the producer may be able to write. The constraints illustrated in Table 1 effectively separate the memory bank(s) a producer may access from the memory bank(s) a consumer may access thereby avoiding memory bank conflicts by making that the memory bank allocation among the producer and the consumer are mutually exclusive.

In another example implementation, the number of memory banks reserved for the producer can be relaxed to $1 \leq K \leq M-1$, where a minimum of one, e.g., at least one, memory bank is reserved to the consumer.

For purposes of illustration, consider another example using the 3×3 filter where 4 lines are needed in the circular buffer (e.g., N=4) to ensure concurrent operation of the producer and the consumer. In this example, only 3 memory banks and 3 locks are available for implementation of the circular buffer (e.g., M=3). Further, a single memory bank is reserved for the producer (e.g., K=1). In this example, the coarse size is c=2 such that 2 image lines (e.g., 2 objects) are stored per memory bank bringing the total storage capacity of the circular buffer to 6 image lines (e.g., objects).

Referring to case 1, the maximum acquire for the producer is 1 while the maximum acquire for the consumer is 2c=4. Thus, the producer is allowed to acquire 1 object each execution iteration while the consumer is allowed to acquire up to 4 objects each execution iteration. This example follows the illustration above where more objects are given to the consumer than the producer. The producer always produces a single line per execution iteration, which meets the requirement of case 1. That is, the constraint for the producer in case 1, $a_{max,P} = (K-1) \times c + 1$, evaluates to $(1-1) \times 2 + 1 = 0 + 1 = 1$. For the consumer in case 1, the constraint $a_{max,C} = (M-K) \times c$ evaluates to $(3-1) \times 2 = 2 \times 2 = 4$. Since the consumer maximally acquires 3 lines, the constraints are met and the existence of a deadlock free schedule is guaranteed. Following the constraints for case 1, the producer and consumer will not deadlock.

Case 2, in general, seeks to give the producer circuit a larger number of objects thereby increasing the amount of data, e.g., the number of objects, that may be written each execution iteration. Continuing with the foregoing example and with reference to case 2, the maximum acquire for both the producer and the consumer is c or 2 in this example. Following the constraints for case 2, the producer and consumer will not deadlock.

Continuing with the foregoing example and with reference to case 3, case 3 is a special example of case 1. Typically, the consumer is allocated more objects than the producer to meet expectations of kernel size. In some applications, however, it may be desirable to fill the circular buffer faster. In such cases, rather than allowing the producer to acquire 1 object each execution iteration, the producer may be allowed to acquire 2 objects each execution iteration. This may be specified as the maximum acquire for the producer (e.g., at least in this example) as the min(2, c). That is, the maximum acquire for the producer in this example is 2 or the value of c. In this example, c=2, so the maximum acquire for the producer is 2. This allows the producer to write 2 objects at once (e.g., during a single execution iteration) to fill the circular buffer faster than would be the case were the producer allowed to acquire a maximum of 1 object each execution iteration. The maximum acquire for the consumer may be 2c=4.

In the example of case 3, deadlock free operation may be guaranteed if a minimalistic deadlock detection mechanism is used. In case 3, there may be cases where the consumer is unable to continue execution. In such cases, the buffer controller 404 may exceptionally give the producer a memory bank that is allocated to the consumer. Because the buffer controller 404 knows the full state of the circular buffer, buffer controller 404 ensures that no object needed by the consumer is overwritten.

Referring to case 3 in general, a deadlock detection circuit may be used that is capable of detecting a state in which both the consumer and the producer are acquiring their maximum number of objects, where the objects the consumer tries to acquire are spread over M−K+1 memory banks. In that case, in response to the consumer not successfully completing the maximum acquire, the buffer controller 404, the acquisition controller 416, grants the producer exceptional access to a memory bank that is still reserved for the consumer. More particularly, the producer is granted access to, or allocated, the particular memory bank to which the consumer bank position 408 points.

Referring generally to FIGS. 3-5, the buffer controller may be implemented in controller program code of the producer(s) and the consumer(s), as a separate software process (e.g., executing in particular or single processor), or as a hardware process. As such, the buffer controller, whether implemented using one, two, or more processors or as a hardened circuit block, is capable of operating as follows. Regarding acquisition, in response to receiving an acquire request for n objects from either the producer or the consumer, the buffer controller is capable of first checking the validity of the acquire request. Acquire operations are always blocking for both the producer and the consumer to obtain extra memory banks to accommodate the n objects. The buffer controller is capable of adding the newly acquired memory bank(s) to a list of available memory banks for the requesting entity. The buffer controller, for example, is capable of maintaining a list of memory banks that have been acquired by the producer and the consumer. The buffer controller further is capable of making the n requested objects available to the requesting entity.

Regarding release of m objects by the producer or the consumer, e.g., in response to a received release request, the buffer controller is capable of checking the validity of the release. Releases are non-blocking. The buffer controller is capable of releasing all memory banks that contain only released objects. The buffer controller may then update the bank position and the object position of the entity.

The following is an illustrative example of the operations described above. Consider an example where the consumer wants to acquire 3 objects. In response to receiving the acquire request, the buffer controller is capable of performing a validity check by ensuring that the acquire request is not requesting 0 objects (e.g., containers). As long as these three objects have not been created by the producer and made available to the consumer by way of release, the consumer will block. In this case, both the producer and the consumer acquires are blocking.

In response to acquire requests, the buffer controller is capable of checking the states of the hardware locks. If enough memory banks are allocated or reserved for the requesting entity to accommodate the requested objects, the buffer controller grants the acquisition request. If enough memory banks are not available, the buffer controller determines how many additional memory banks are needed. In that case, the buffer controller waits for the hardware locks to show that the needed number of memory banks are available, at which time processing can continue in that the request may be granted.

In response to release requests, the buffer controller is also capable of performing a validity check. For example, the buffer controller is capable of ensuring that the releasing entity is not releasing more objects than were requested. In an example where a first memory bank includes objects 1, 2; a second memory bank includes objects 3, 4; and a third memory bank includes objects 5, 6. For a given release, if only object 3 of memory bank 2 is released, memory bank 2 may not be released. For a subsequent release, objects 4 and 5 are released, memory bank 2 may be released using the hardware locks, but memory bank 3 may not be released since memory bank 3 still stores object 6. Memory bank 3 may not be released by the hardware locks until such time that both objects 5 and 6 are released.

Figure 6:
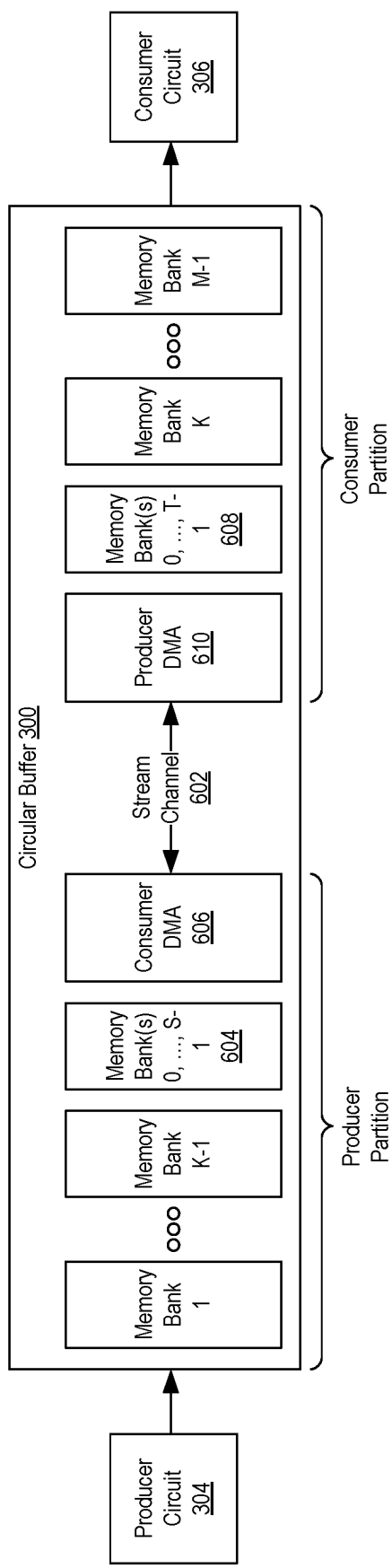
FIG. 6 illustrates another example implementation of a circular buffer in accordance with the inventive arrangements described within this disclosure.

FIG. 6 illustrates another example implementation of circular buffer 300 in accordance with the inventive arrangements described within this disclosure. In the example of FIG. 6, circular buffer 300 is implemented using two DPEs of a DPE array where the DPEs are non-adjacent. That is, a memory module 120 of a first DPE is used to store one or more objects, while a memory module 120 of a second DPE that is non-adjacent with the first DPE is used to store the remaining objects of the circular buffer. The two memory modules are communicatively linked via stream channel 602 by the DMA engine in each of the respective memory modules and through a plurality of communicatively linked stream switches. Objects are exchanged between producer circuit 304 and consumer circuit 306 by way of stream channel 602 established using the plurality of stream switches and the DMA engines. Stream channel 602 represents a stream network connection between DMA engines established over two or more stream switches.

As an illustrative and non-limiting example, the first DPE may be DPE 116-4, while the second DPE may be DPE 116-6. Producer circuit 304 may be implemented using core 118-4, while consumer circuit 306 may be implemented using core 118-6. DPE 116-5 is an intervening DPE between DPEs 116-4 and 116-6. Memory banks 1 through K−1 and 604 and consumer DMA 606 may be implemented using memory module 120-4 (e.g., using memory banks 212 and DMA engine 218 of memory module 120-4). Memory banks and K through M−1 and 608 and producer DMA engine 610 may be implemented using memory module 120-6 (e.g., using memory banks 212 and DMA engine 218 of memory module 120-6).

In the example of FIG. 6, circular buffer 300 is subdivided into two different portions where one generally corresponds to the producer (e.g., the producer partition) and the other generally corresponds to the consumer (e.g., the consumer partition). The producer partition and the consumer partition each may be considered an independent circular buffer implementation. In subdividing circular buffer 300, one or more additional memory banks 604 are added to the producer portion, e.g., in memory module 120-4, while one or more additional memory banks 608 are added to the consumer portion, e.g., in memory module 120-6. The additional memory banks 604 and 608 are used for the consumer DMA 606 and the producer DMA 610 to load and store objects as such objects are conveyed over the stream switches.

In the example of FIG. 6, consumer DMA 606, as located in the producer partition, is capable of copying objects released by the producer circuit 304 into stream channel 602. Consumer DMA 606 copies the released objects onto the stream channel 602 while adhering to the constraints previously described, e.g., the constraints of case 1, 2, or 3. In the producer partition, S additional memory banks are included as memory banks 604. In terms of the maximum number of objects to be acquired by the producer and the consumer (e.g., $a_{max,P}$ and $a_{max,C}$), the number of memory banks M is adapted to the number of memory banks $M_P=K+S$ in the producer partition of the circular buffer 300. Referring to Table 1, case 2 is transformed into the expression: $a_{max,C}=(M_P-K-1)\times c=(K+S-K-1)\times c=(S-1)\times c$. As a result, $S>1$ to ensure that $a_{max,C}>1$. This means that at least 2 memory banks need to be added as memory banks 608. This operation also satisfies the constraint $1 \leq K \leq M_P-2$.

Similarly, producer DMA 610, which is located in the consumer partition of circular buffer 300, loads objects from stream channel 602 while adhering to the constraints expressed in Table 2. In the consumer partition, T additional memory banks are included as memory banks 608. Using $M_C$ and $K_C$ in the expressions for $a_{max,P}$ and $a_{max,C}$ results in $M_C=M-K+T$ and $K_C=T$. In the producer partition, $a_{max,P}$ is unmodified since K is unchanged. As a result, the producer process may retain the same, e.g., unmodified, acquire-release pattern. In the consumer partition, $a_{max,C}$ is unmodified since $M_C-K_C=M-K+T-T=M-K$ and $a_{max,C}$ only depends on $M_C-K_C$ in each of cases 1, 2, and 3. As a result, the consumer process can retain the same, e.g., unmodified, acquire-release pattern.

In the example of FIG. 6, each of the producer partition and the consumer partition may have a buffer controller implemented therefor. In one aspect, the buffer controller for the producer partition may be implemented as control program code executed by the producer circuit 304, while the buffer controller for the consumer partition may be implemented as control program code executed by the consumer circuit 306. In another aspect, the buffer controller for the producer circuit 304 may be implemented as a hardened circuit block, while the buffer controller for the consumer circuit 306 may be implemented as another hardened circuit block. In any case, the buffer controller for the producer partition may control acquisitions and releases for the producer circuit with respect to the producer partition and, in doing so, provide instructions to consumer DMA 606. Similarly, the buffer controller for the consumer partition may control acquisitions and releases for the consumer circuit with respect to the consumer partition and, in doing so, provide instructions to producer DMA 610.

Though described in connection with two non-adjacent DPEs, in another aspect, stream channel 602 need not be constrained to one within the DPE array using the DMA engines of DPEs. In the case of a heterogeneous device as illustrated in the example of FIG. 1, stream channel 602 may be a connection between a DPE and another subsystem or region of the IC or a connection between a producer circuit implemented in one subsystem (e.g., PL 104, PS 106, DPE array 102, HCB 112) and a consumer circuit implemented in a different one of the subsystems. For example, a DPE may be connected to a circuit implemented in PL 104 or to the PS 106. In that case, the part of the circular buffer 300 (e.g., whether the producer partition or the consumer partition) corresponding to the particular entity implemented using PL 104 or PS 106 may also be implemented in that entity.

The additional memory banks included in each of the respective memory modules provide additional object storage for use by the DMA engine in each respective memory module to transfer the plurality of objects.

In one or more other example implementations, the other entity may be located external to the IC in which the DPE array is implemented. This means that the circular buffer 300 would span multiple devices or ICs.

Within this disclosure, whether the circular buffer is implemented in adjacent or non-adjacent DPEs, in cases where the buffer controller 404 is implemented using software executing on the scalar processor 206, a significant amount of processing overhead may be incurred. That is, for clock cycles where the scalar processor 206 is performing circular buffer control operations, the instruction (e.g., the VLIW) for the core would include only an instruction for the scalar processor 206 to perform an operation and would not include an instruction for the vector processor 208. This results in the vector processor 208 being idle for such clock cycles and the core not performing the function of the kernel and/or application being executed. A hardened implementation, e.g., a dedicated circuit block, of buffer controller 404 may improve efficiency over the software implementation of the buffer controller 404 particularly where the scalar processor 206 is used.

The inventive arrangements described within this disclosure may be adapted to utilize other types of hardware locks such as those with more than 2 states, e.g., counting locks. In such cases, rather than using one hardware lock per memory bank, one hardware lock may be used per producer and one hardware lock used per consumer. The count of the hardware lock, in such implementations, should be large than or equal to the number of memory banks being used to implement the circular buffer.

In the examples described herein, each hardware lock is presumed to be a 2-state hardware lock where one state is acquired-for-producer and the other state is acquired-for-consumer. In using 2-state hardware locks with the states described, only one lock per memory bank is required. In circuit architectures that have 1-state locks, a 2-state lock may be constructed by combining two 2-state locks.

The inventive arrangements described within this disclosure may be adapted to operate using two or more producers, two or more consumers, or any combination thereof of one or more or multiple producers and/or consumers. In such implementations, additional hardware locks would be utilized. In the case of using 2-state locks, for example, a single 2-state lock would be used per bank as well as a single 2-state lock used per producer and a single 2-state lock per consumer. In the case of multi-state hardware locks (e.g., those having more than 2 states), the circular buffer implementation would utilize 1 hardware lock per producer and one hardware lock per consumer.

Figure 7:
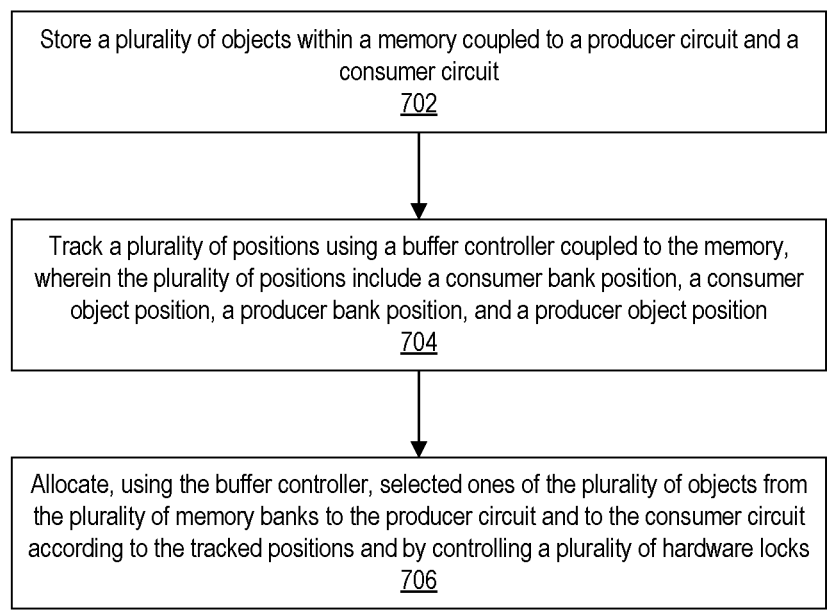
FIG. 7 illustrates an example method illustrating certain operative features of a circular buffer in accordance with the inventive arrangements described within this disclosure.

FIG. 7 illustrates an example method 700 illustrating certain operative features of a circular buffer in accordance with the inventive arrangements described within this disclosure. In block 702, a plurality of objects are stored within a memory coupled to a producer circuit and a consumer circuit. The plurality of objects are stored across a plurality of memory banks of the memory. The number of the plurality of memory banks is less than a number of the plurality of objects. In block 704, a plurality of positions are tracked using a buffer controller coupled to the memory. The plurality of positions include a consumer bank position, a consumer object position, a producer bank position, and a producer object position. In block 706, using the buffer controller, selected ones of the plurality of objects from the plurality of memory banks are allocated to the producer circuit and to the consumer circuit according to the tracked positions and by controlling a plurality of hardware locks. The plurality of hardware locks are configured to reserve selected ones of the plurality of memory banks for use by the producer circuit or the consumer circuit.

The foregoing and other implementations can each optionally include one or more of the following features, alone or in combination. Some example implementations include all the following features in combination.

In one aspect, a number of the plurality of hardware locks is less than the number of the plurality of objects.

In another aspect, the buffer controller is configured with acquisition constraints for each of the producer circuit and the consumer circuit that avoid deadlock.

In another aspect, the producer circuit is implemented by a first core disposed in a first data processing engine of a data processing engine array and the consumer circuit is implemented in a second core disposed in second data processing engine of the data processing engine array.

In another aspect, the first data processing engine is adjacent to the second data processing engine.

In another aspect, the memory is a memory module implemented in the first data processing engine or the second data processing engine.

In another aspect, the first data processing engine and the second data processing engine are non-adjacent and separated by at least one other intervening data processing engine such that data transfers between the producer circuit and the consumer circuit through the memory take place over a stream channel using a direct memory access engine within each of the first and second data processing engines.

In another aspect, the memory is formed using a first memory module disposed in the first data processing engine and a second memory module disposed in the second data processing engine. The plurality of objects are apportioned between the first memory module and the second memory module.

Figure 8:
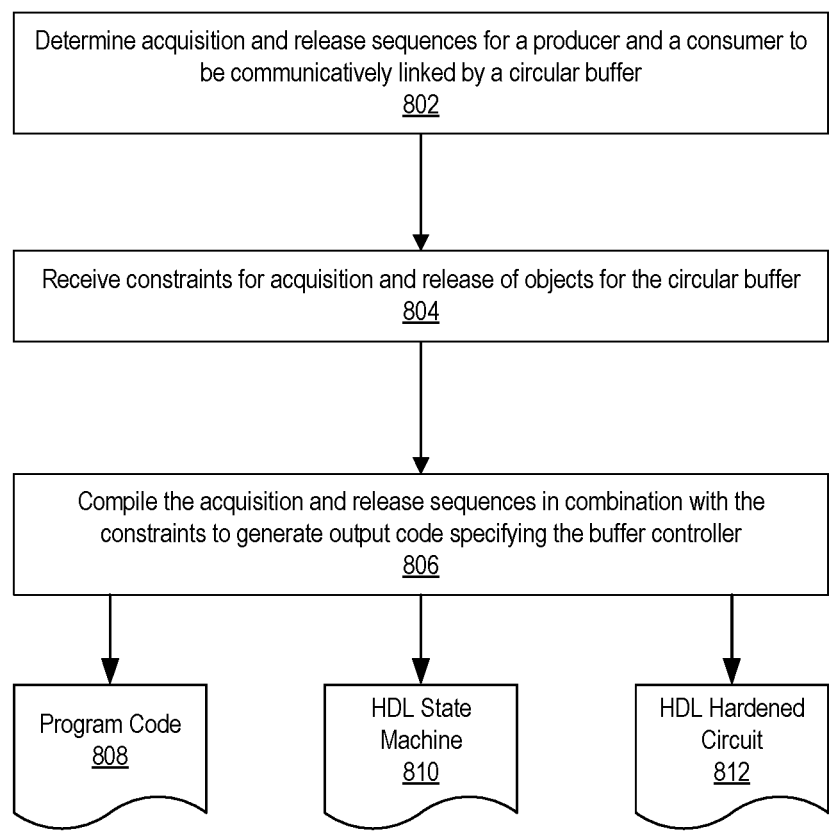
FIG. 8 illustrates an example method of implementing a buffer controller in accordance with the inventive arrangements described herein.

FIG. 8 illustrates an example method 800 of implementing a buffer controller in accordance with the inventive arrangements described herein. Method 800 may be performed by a data processing system (system) executing suitable operational software such as a software or a hardware compiler. An example of a data processing system is described in connection with FIG. 9.

In block 802, the system receives acquisition and release sequences for a producer and a consumer that are to be communicatively linked through a circular buffer. The acquisition and release sequences may be determined, e.g., by a compiler, from an analysis of the source code, whether high-level programming language code such as C/C++ or hardware description language specifying the behavior of a circuit, for each of the producer and the consumer.

In block 804, the system receives constraints for acquisition and release of objects for the circular buffer. As an example, the constraints may be those described in connection with Table 1 and correspond to case 1, 2, or 3. In one example, the particular set of constraints may be specified as input to the compiler by a user.

In block 806, the compiler, as executed by the system, is capable of compiling the acquisition and release sequences in combination with the constraints to generate output code specifying the buffer controller. In one aspect, the output code may be control program code 808 that may be incorporated into the producer and consumer program code that is generated. In that case, the buffer controller is implemented as executable program code executed by the particular cores (e.g., processors) executing the producer and the consumer as previously described herein.

In another aspect, in the case of a centralized buffer controller, the output code may be hardware description language (HDL) 810, e.g., a register transfer level (RTL) description, that describes a state machine that may be implemented as software executed by a dedicated processor functioning as the buffer controller. In still another aspect, in the case of a centralized buffer controller implemented as a hardened circuit block the output code may be HDL 812 specifying an implementation of the hardened circuit block or specifying configuration data to configure an existing hardened circuit block.

Figure 9:
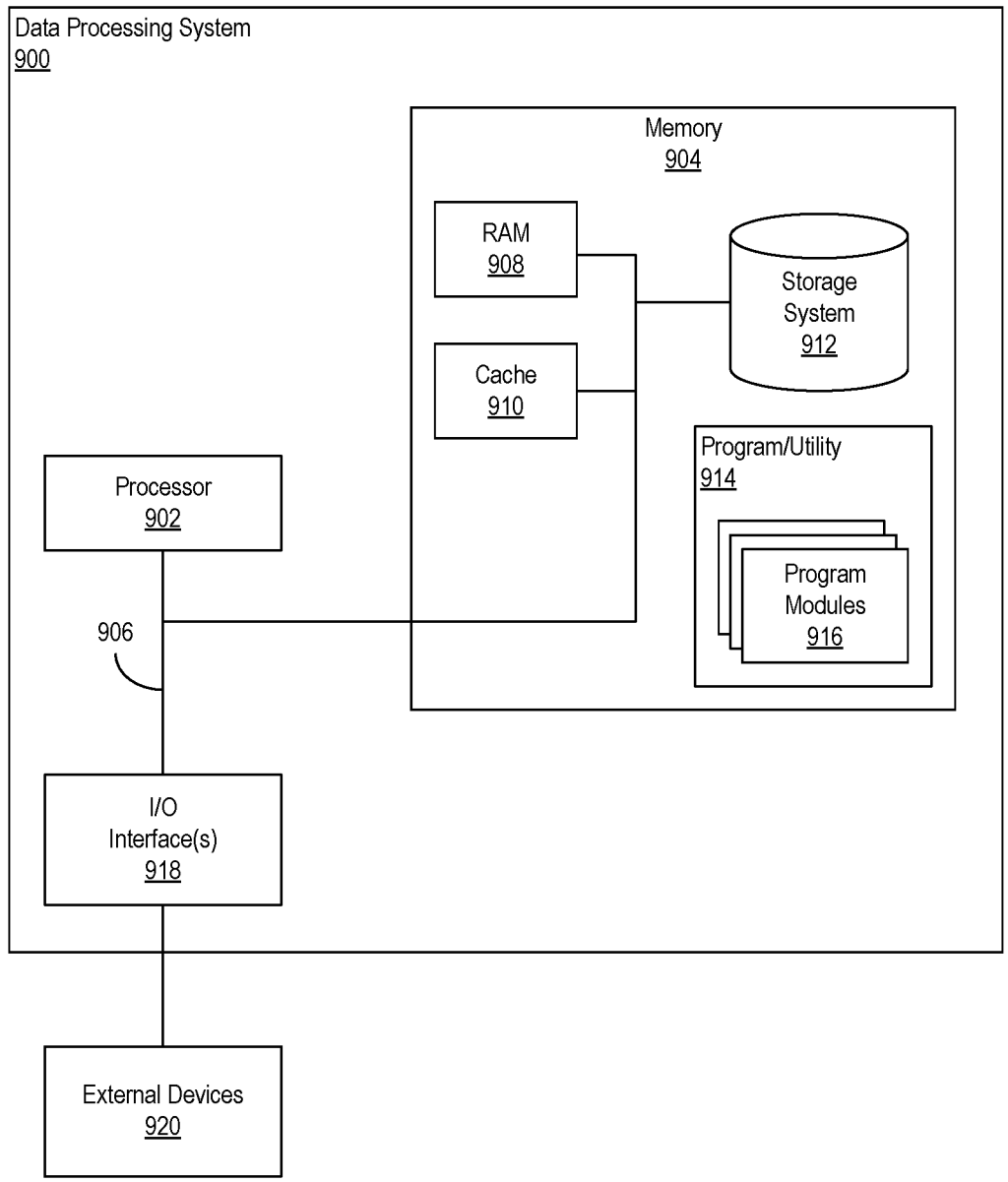
FIG. 9 illustrates an example of a data processing system for use with the inventive arrangements described herein.

FIG. 9 illustrates an example implementation of a data processing system 900. As defined herein, "data processing system" means one or more hardware systems configured to process data, each hardware system including at least one processor programmed to initiate operations and memory.

The components of data processing system 900 can include, but are not limited to, a processor 902, a memory 904, and a bus 906 that couples various system components including memory 904 to processor 902. Processor 902 may be implemented as one or more processors. In an example, processor 902 is implemented as a central processing unit (CPU). As defined herein, the term "processor" means at least one circuit capable of carrying out instructions contained in program code. The circuit may be an integrated circuit or embedded in an integrated circuit. Processor 902 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 906 represents one or more of any of a variety of communication bus structures. By way of example, and not limitation, bus 906 may be implemented as a Peripheral Component Interconnect Express (PCIe) bus. Data processing system 900 typically includes a variety of computer system readable media. Such media may include computer-readable volatile and non-volatile media and computer-readable removable and non-removable media.

Memory 904 can include computer-readable media in the form of volatile memory, such as random-access memory (RAM) 908 and/or cache memory 910. Data processing system 900 also can include other removable/non-removable, volatile/non-volatile computer storage media. By way of example, storage system 912 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 906 by one or more data media interfaces. Memory 904 is an example of at least one computer program product.

Program/utility 914, having a set (at least one) of program modules 916, may be stored in memory 904. Program/utility 914 is executable by processor 902. By way of example, program modules 916 may represent an operating system, one or more application programs, other program modules, and program data. Program modules 916, upon execution, cause data processing system 900, e.g., processor 902, to carry out the functions and/or methodologies of the example implementations described within this disclosure. Program/utility 914 and any data items used, generated, and/or operated upon by data processing system 900 are functional data structures that impart functionality when employed by data processing system 900. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

For example, one or more program modules 916 may implement a software compiler, a hardware, compiler, or both. Program modules 916 may also implement an Electronic Design Automation (EDA) system that is capable of performing a design flow (e.g., synthesis, placement, and/or routing) on a circuit design or portion thereof so that a circuit design may be physically realized in an IC.

Data processing system 900 may include one or more Input/Output (I/O) interfaces 918 communicatively linked to bus 906. I/O interface(s) 918 allow data processing system 900 to communicate with one or more external devices 920 and/or communicate over one or more networks such as a local area network (LAN), a wide area network (WAN), and/or a public network (e.g., the Internet). Examples of I/O interfaces 918 may include, but are not limited to, network cards, modems, network adapters, hardware controllers, etc. Examples of external devices also may include devices that allow a user to interact with data processing system 900 (e.g., a display, a keyboard, and/or a pointing device) and/or other devices such as accelerator card.

Data processing system 900 is only one example implementation. Data processing system 900 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 9 is not intended to suggest any limitation as to the scope of use or functionality of example implementations described herein. Data processing system 900 is an example of computer hardware that is capable of performing the various operations described within this disclosure. In this regard, data processing system 900 may include fewer components than shown or additional components not illustrated in FIG. 9 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 900 may be operational with numerous other general-purpose or special-purpose computing system environments or configurations. Examples of computing systems, environments, and/or configurations that may be suitable for use with data processing system 900 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 900 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

An electronic system includes a circular buffer. The circular buffer can include a memory coupled to a producer circuit and a consumer circuit. The memory is configured to store a plurality objects. The memory can include a plurality of memory banks. A number of the plurality of memory banks is less than a number of the plurality of objects. The circular buffer can include a plurality of hardware locks configured to reserve selected ones of the plurality of memory banks for use by the producer circuit or the consumer circuit. The circular buffer can include a buffer controller coupled to the memory and configured to track a plurality of positions including a consumer bank position, a consumer object position, a producer bank position, and a producer object position. The buffer controller can be configured to allocate selected ones of the plurality of objects from the plurality of memory banks to the producer circuit and to the consumer circuit according to the tracked positions and using the plurality of hardware locks.

The foregoing and other implementations can each optionally include one or more of the following features, alone or in combination. Some example implementations include all the following features in combination.

In one aspect, a number of the plurality of hardware locks is less than the number of the plurality of objects.

In another aspect, the buffer controller is configured with acquisition constraints for each of the producer circuit and the consumer circuit that avoid deadlock.

In another aspect, the producer circuit is implemented by a first core disposed in a first data processing engine of a data processing engine array and the consumer circuit is implemented in a second core disposed in second data processing engine of the data processing engine array.

In another aspect, the first data processing engine is adjacent to the second data processing engine.

In another aspect, the memory is a memory module implemented in the first data processing engine or the second data processing engine.

In another aspect, the first data processing engine and the second data processing engine are non-adjacent and separated by at least one other intervening data processing engine such that data transfers between the producer circuit and the consumer circuit through the memory take place over a stream channel using a direct memory access engine within each of the first and second data processing engines.

In another aspect, the memory is formed using a first memory module disposed in the first data processing engine and a second memory module disposed in the second data processing engine. The plurality of objects can be apportioned between the first memory module and the second memory module.

In another aspect, one or more additional memory banks from each of the first memory module and the second memory module are included in the circular buffer to provide additional object storage for use by the direct memory access engine in each respective memory module to transfer the plurality of objects.

In another aspect, the buffer controller is implemented as a scalar processor executing program code within a core of a data processing engine of the data processing engine array.

In another aspect, the buffer controller is implemented as a hardened circuit block.

In another aspect, the buffer controller is configured to control allocation of banks to the producer circuit and the consumer circuit using the hardware locks and to control allocation of objects to the producer circuit and the consumer circuit according to which of the plurality of objects have been released by the producer circuit and the consumer circuit in each execution iteration.

What is claimed is:

1. An electronic system having a circular buffer, the circular buffer comprising:
a memory coupled to a producer circuit and a consumer circuit, wherein the memory is configured to store a plurality of objects;
wherein the memory comprises a plurality of memory banks, wherein a number of the plurality of memory banks is less than a number of the plurality of objects;
a plurality of hardware locks configured to reserve selected ones of the plurality of memory banks for use by the producer circuit or the consumer circuit; and
a buffer controller coupled to the memory and configured to track a plurality of positions including a consumer bank position, a consumer object position, a producer bank position, and a producer object position;
wherein the buffer controller is configured to allocate selected ones of the plurality of objects from the plurality of memory banks to the producer circuit and to the consumer circuit according to the plurality of positions as tracked and using the plurality of hardware locks.

2. The electronic system of claim 1, wherein a number of the plurality of hardware locks is less than the number of the plurality of objects.

3. The electronic system of claim 1, wherein the buffer controller is configured with acquisition constraints for each of the producer circuit and the consumer circuit that avoid deadlock.

4. The electronic system of claim 1, wherein the producer circuit is implemented by a first core disposed in a first data processing engine of a data processing engine array and the consumer circuit is implemented in a second core disposed in a second data processing engine of the data processing engine array.

5. The electronic system of claim 4, wherein the first data processing engine is adjacent to the second data processing engine.

6. The electronic system of claim 5, wherein the memory is a memory module implemented in the first data processing engine or the second data processing engine.

7. The electronic system of claim 4, wherein the first data processing engine and the second data processing engine are non-adjacent and separated by at least one other intervening data processing engine such that data transfers between the producer circuit and the consumer circuit through the memory take place over a stream channel using a direct memory access engine within each of the first and second data processing engines.

8. The electronic system of claim 7, wherein:
the memory is formed using a first memory module disposed in the first data processing engine and a second memory module disposed in the second data processing engine; and
the plurality of objects are apportioned between the first memory module and the second memory module.

9. The electronic system of claim 8, wherein one or more additional memory banks from each of the first memory module and the second memory module are included in the circular buffer to provide additional object storage for use by the direct memory access engine in the first memory module and the second memory module to transfer the plurality of objects.

10. The electronic system of claim 1, wherein the buffer controller is implemented as one or more processors executing program code within one or more respective cores of one or more respective data processing engines of the data processing engine array.

11. The electronic system of claim 1, wherein the buffer controller is implemented as a hardened circuit block.

12. The electronic system of claim 1, wherein the buffer controller is configured to control allocation of banks to the producer circuit and the consumer circuit using the hardware locks and to control allocation of objects to the producer circuit and the consumer circuit according to which of the plurality of objects have been released by the producer circuit and the consumer circuit in each execution iteration.

13. A method, comprising:
storing a plurality of objects within a memory coupled to a producer circuit and a consumer circuit;
wherein the plurality of objects are stored across a plurality of memory banks of the memory, wherein a number of the plurality of memory banks is less than a number of the plurality of objects;
tracking a plurality of positions using a buffer controller coupled to the memory, wherein the plurality of positions include a consumer bank position, a consumer object position, a producer bank position, and a producer object position; and
allocating, using the buffer controller, selected ones of the plurality of objects from the plurality of memory banks to the producer circuit and to the consumer circuit according to the plurality of positions as tracked and by controlling a plurality of hardware locks;
wherein the plurality of hardware locks are configured to reserve selected ones of the plurality of memory banks for use by the producer circuit or the consumer circuit.

14. The method of claim 13, wherein a number of the plurality of hardware locks is less than the number of the plurality of objects.

15. The method of claim 13, wherein the buffer controller is configured with acquisition constraints for each of the producer circuit and the consumer circuit that avoid deadlock.

16. The method of claim 13, wherein the producer circuit is implemented by a first core disposed in a first data processing engine of a data processing engine array and the consumer circuit is implemented in a second core disposed in a second data processing engine of the data processing engine array.

17. The method of claim 16, wherein the first data processing engine is adjacent to the second data processing engine.

18. The method of claim 16, wherein the memory is a memory module implemented in the first data processing engine or the second data processing engine.

19. The method of claim 16, wherein the first data processing engine and the second data processing engine are non-adjacent and separated by at least one other intervening data processing engine such that data transfers between the producer circuit and the consumer circuit through the memory take place over a stream channel using a direct memory access engine within each of the first and second data processing engines.

20. The method of claim 19, wherein:
the memory is formed using a first memory module disposed in the first data processing engine and a second memory module disposed in the second data processing engine; and
the plurality of objects are apportioned between the first memory module and the second memory module.

* * * * *